United States Patent
Kang et al.

(10) Patent No.: US 9,420,597 B2
(45) Date of Patent: Aug. 16, 2016

(54) SCHEDULING METHOD AND APPARATUS FOR USE IN D2D COMMUNICATION SYSTEM

(71) Applicants: Samsung Electronics Co., Ltd., Suwon-si, Gyeonggi-do (KR); KOREA UNIVERSITY RESEARCH AND BUSINESS FOUNDATION, Seoul (KR)

(72) Inventors: Chunggu Kang, Seoul (KR); Hyejoong Kang, Seoul (KR); Jinwook Kim, Yongin-si (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 118 days.

(21) Appl. No.: 14/099,320

(22) Filed: Dec. 6, 2013

(65) Prior Publication Data
US 2014/0160966 A1 Jun. 12, 2014

(30) Foreign Application Priority Data
Dec. 7, 2012 (KR) ........................ 10-2012-0142263

(51) Int. Cl.
*H04W 4/00* (2009.01)
*H04W 72/12* (2009.01)
*H04W 74/08* (2009.01)

(52) U.S. Cl.
CPC ...... *H04W 72/1205* (2013.01); *H04W 74/0816* (2013.01)

(58) Field of Classification Search
None
See application file for complete search history.

(56) References Cited

U.S. PATENT DOCUMENTS

| | | | |
|---|---|---|---|
| 7,983,230 B1* | 7/2011 | Li et al. | 370/338 |
| 2007/0054690 A1* | 3/2007 | Wu et al. | 455/522 |
| 2007/0147322 A1* | 6/2007 | Agrawal et al. | 370/338 |
| 2011/0090855 A1* | 4/2011 | Kim | 370/329 |
| 2013/0142185 A1* | 6/2013 | Leizerovich et al. | 370/338 |

* cited by examiner

*Primary Examiner* — Chi H Pham
*Assistant Examiner* — Soon-Dong D Hyun
(74) *Attorney, Agent, or Firm* — Jefferson IP Law, LLP

(57) ABSTRACT

A scheduling method and an apparatus are provided for use in a Device-to-Device (D2D) communication system. A scheduling method of a node in a wireless communication system according to the present disclosure includes acquiring a first data rate on a first link in consideration of interference occurring when a second link is established, acquiring a second data rate on the first link without consideration of the second link, acquiring, when the second link is established, a third data rate on the second link, and determining whether to establish the second link in consideration of the first data rate, second data rate, and third data rate.

19 Claims, 11 Drawing Sheets

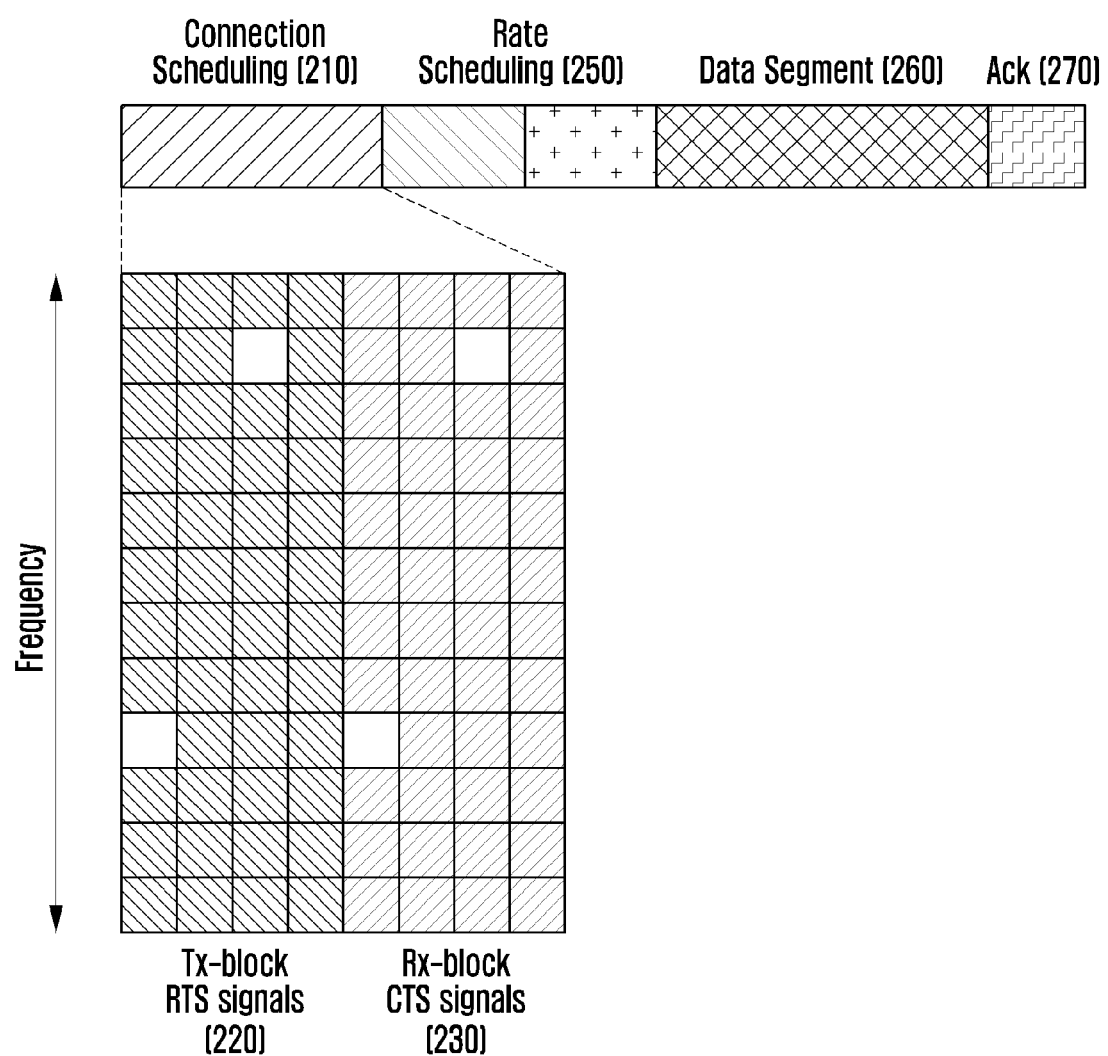

SCHEDULING METHOD AND APPARATUS FOR USE IN D2D COMMUNICATION SYSTEM

CROSS-REFERENCE TO RELATED APPLICATION(S)

This application claims the benefit under 35 U.S.C. §119 (a) of a Korean patent application filed on Dec. 7, 2012 in the Korean Intellectual Property Office and assigned Serial number 10-2012-0142263, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. 2) KOREA UNIVERSITY RESEARCH AND BUSINESS FOUNDATION.

TECHNICAL FIELD

The present disclosure relates to a scheduling method and apparatus for use in a Device-to-Device (D2D) communication system.

BACKGROUND

In an Orthogonal Frequency Division Multiplexing (OFDM) synchronous D2D communication system, maximizing the spatial resource reuse efficiency is preferred. In order to achieve maximization of the spatial resource reuse efficiency, maximizing a number of terminals in communication while maintaining Signal-to-Interference Ratio (SIR) of the recipient terminals at certain levels according to the channel condition is generally necessary.

For D2D communication without assistance of a base station, a scheduling procedure for configuring links in a distributed manner. For example, in the case of Carrier Sense Multiple Access with Collision Avoidance (CSMA-CA) adopted by the Institute of Electrical and Electronics Engineers (IEEE) 802.11 Wireless Local Area Network (WLAN) standard, Request to Send (RTS) and Clear to Send (CTS) control frames are used. In this method, the transmitter and the receiver perform handshaking by exchanging the RTS/CTS control frames for link scheduling. For example, the D2D transmission node sends an RTS frame, and the D2D reception node sends a CTS frame in reply such that the neighboring nodes receiving this message suspend transmission temporarily. Through this RTS-CTS handshaking procedure, preventing the hidden nodes from incurring interference to the transmission node of D2D link so as to secure D2D link successfully is possible.

FIG. 1A is a diagram illustrating the RTS-CTS handshaking procedure of an asynchronous system according to the related art.

Referring to FIG. 1A, a link A-B is depicted. The node A of the link A-B sends an RTS message which is receivable within an area 110 (e.g., RTS circle). Likewise, the area 120 in which the CTS message transmitted by the node B is referred to as CTS circle 120. Within the CTS circle 120, all nodes with the exception of the node B mute transmission during a predetermined backoff time. Accordingly, the number of D2D links reusable spatially is determined based on the radius of the CTS circle (CTS radius). This method is used in the current IEEE 802.11 WLAN standard. Because the handshaking for link scheduling is performed by exchanging RTS and CTS control frames transmitted at certain timings without any synchronization configuration, this is categorized into the asynchronous scheme. At this time, because each node does not know the distance between transmission and reception nodes, the RTS and CTS radiuses have to be long enough and thus may cause spatial reuse inefficiency.

FIG. 1B is a diagram illustrating an RTS-CTS handshaking procedure of a synchronous system according to the related art.

Referring to FIG. 1B, in the OFDM-based synchronous D2D communication system, measuring mutual interferences incurring between the nodes directly or indirectly using the OFDM tones allocated to the nodes is possible. In such a case, maximizing the spatial reuse efficiency is possible by setting the RTS and CTS area to appropriate sizes. FIG. 1B is directed to a FlashLinQ system among the OFDM-based synchronous D2D communication system having RTS circles 130 (e.g., RTS circle for link A-B) and 150 (e.g., RTS circle for link C-D) and CTS circles 140 (e.g., CTS circle for link A-B) and 160 (e.g., CTS circle for link C-D). As shown in FIG. 1B, the link scheduling is performed with high spatial density. The RTS circle 130 and CTS circle 140 for link A-B may generally almost match each other. Likewise, the RTS circle 150 and CTS circle 160 for the link C-D may generally almost match each other.

The detailed link scheduling procedure for this is performed as follows. First, all D2D links are assigned unique Connection Identifiers (CIDs). Each CID is allocated a single tone corresponding to the transmission node and a single tone corresponding to the reception node according to a unique number of the CID. The link uses one of the single tone corresponding to the transmission node and the single tone corresponding to the reception node that are orthogonal to each other. The transmission node and the reception node are respectively allocated one tone, a set of the transmission node tones, and a set of the reception node tones are respectively defined as Transmission (Tx) block and Reception (Rx) block. The Tx block is the set of tones which the transmission node uses to request for scheduling, and the transmission node transmits a symbol of the tone corresponding to a corresponding CID thereof. This process is referred to as Request To Send (RTS). The RTS acts in a role similar to the RTS transmission in IEEE 802.11, and whether the reception node yield the reception is determined based on the transmission of the tone. If the reception node determines to do not yield, the reception node transmits Clear To Send (CTS) using one tone allocated in the Rx block such that the transmission node estimates an SIR at external reception node using this tone. If both the transmission and reception nodes determine to not yield, the transmission node transmits data.

FIG. 2 is a diagram illustrating a Tx block and an Rx block for use in a synchronous system according to the related art.

Referring to FIG. 2, the transmission frame (other time duration) includes a Connection Scheduling duration 210, a Rate Scheduling duration 250, a Data Segment duration 260, and an ACK duration 270. The Connection Scheduling duration 210 includes Tx block RTS signals 220 and Rx block CTS signals 230. The Connection Scheduling duration 210, the Rate Scheduling duration 250, the Data Segment duration 260, and the ACK duration 270 are categorized on the time axis.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a Device-to-Device (D2D) communication scheduling method and apparatus that is capable of efficient spatial reuse rate.

In accordance with an aspect of the present disclosure, a scheduling method of a node in a wireless communication system is provided. The scheduling method includes acquiring a first data rate on a first link in consideration of interference occurring when a second link is established, acquiring a second data rate on the first link without consideration of the second link, acquiring, when the second link is established, a third data rate on the second link, and determining whether to establish the second link in consideration of the first data rate, second data rate, and third data rate.

In accordance with another aspect of the present disclosure, a scheduling apparatus is provided. The scheduling apparatus includes a controller which controls acquiring a first data rate on a first link in consideration of interference occurring when a second link is established, acquiring a second data rate on the first link without consideration of the second link, acquiring, when the second link is established, a third data rate on the second link, and determining whether to establish the second link based on the first data rate, second data rate, and third data rate, and a receiver which receives a Request to Send (RTS) requesting for establishment of the second link.

In accordance with still another aspect of the present disclosure, a scheduling apparatus is provided. The scheduling apparatus includes a transmitter which transmits a Request to Send (RTS) and a controller which adjusts a transmit power of the RTS according to a state of a buffer.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

FIG. 2 is a diagram illustrating a Transmission (Tx) block and a Reception (Rx) block for use in a synchronous system according to the related art;

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure proposes a scheduling method and apparatus that is capable of achieving throughput higher than throughput of a Orthogonal Frequency Division Multiplexing (OFDM)-based synchronous Device-to-Device (D2D) communication link scheduling method. According to various embodiments of the present disclosure, performing additional scheduling in a tolerable range of adjacent link having low priority is possible by preventing acquisition of unnecessarily high link quality with the buffer status of the link having the high priority.

The synchronous system designates relative priorities to all of the links for link scheduling based on Signal to Interference Ratio (SIR) such that the low priority link is scheduled only when the high priority link is not degraded in SIR. For this purpose, all links have to be allocated priorities and, in this case, priorities are assigned cyclically to give fair link acquisition changes to all of the nodes.

Figure 1A:
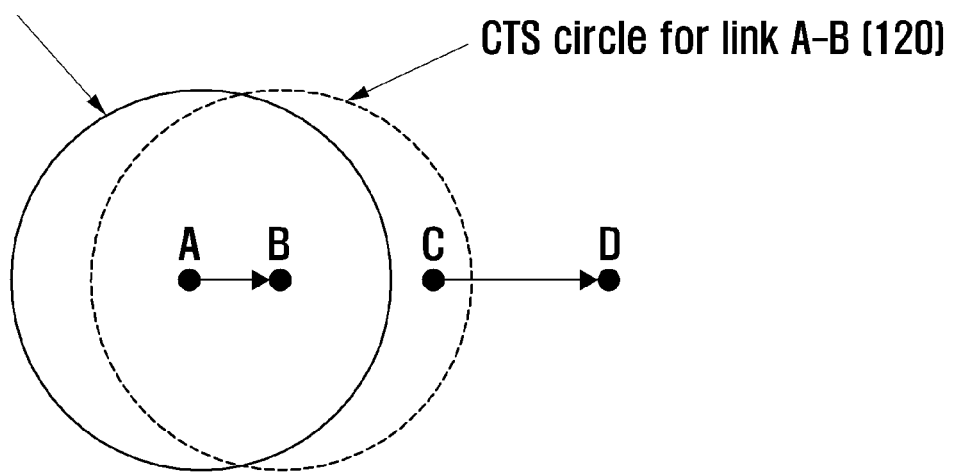
FIG. 1A is a diagram illustrating a Request to Send (RTS)-Clear to Send (CTS) handshaking procedure of an asynchronous system according to the related art.
Figure 1B:
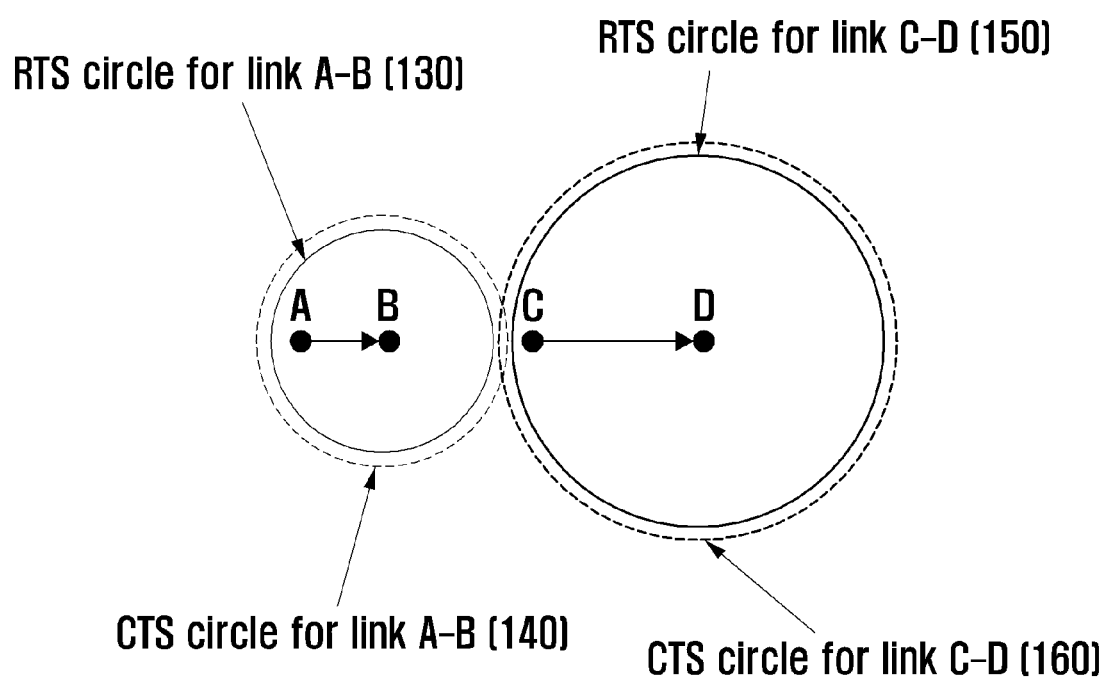
FIG. 1B is a diagram illustrating an RTS-CTS handshaking procedure of a synchronous system according to the related art.
Figure 3:
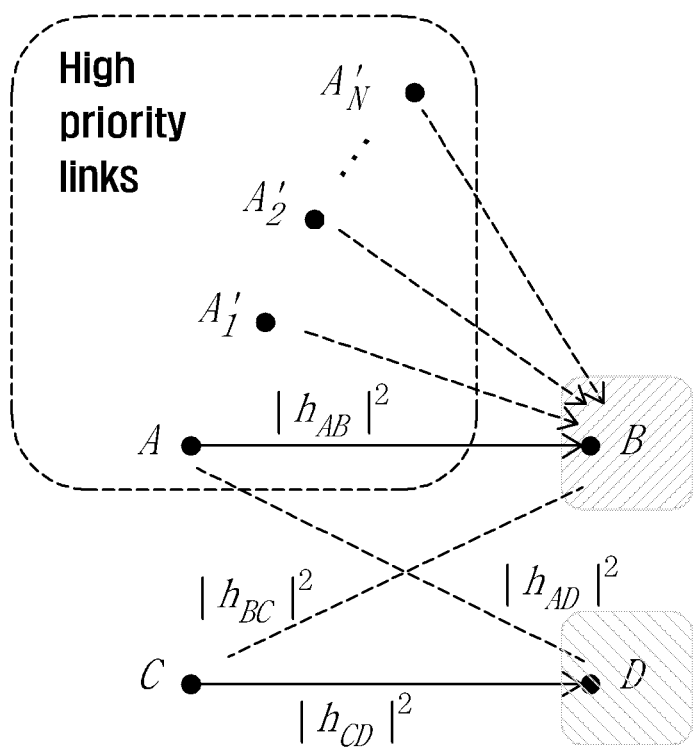
FIG. 3 is a diagram illustrating a Device-to-Device (D2D) link model in consideration of link scheduling according to an embodiment of the present disclosure.

FIG. 3 is a diagram illustrating a D2D link model in consideration of link scheduling according to an embodiment of the present disclosure.

Referring to FIG. 3, a description is made of the basic operations with reference to this model. The higher priority transmission and reception nodes are designated as nodes A and B, and the link between nodes C and D is the D2D link to be scheduled additionally in the situation in which the link A-B has been scheduled. $h_{AB}$ denotes channel gain between the nodes A and B.

Referring to FIG. 3, compared to the interference signal received from an external link with high priority, if the reception signal is not strong enough, the reception node has to give up D2D communication. If the measured SIR is less than a Received (Rx) yielding threshold $\eta_{RX}$, the reception node has to give up the reception on the corresponding link. Such a process of the reception node giving up the reception on the corresponding link is referred to as Rx yielding. The transmission node transmits RTS at a tone predetermined in the Transmission (Tx) block at a fixed transmit power, the reception nodes measure SIR using the power of the RTS signal. If the measured SIR is greater than an Rx yielding threshold, CTS is transmitted in the Rx block. Otherwise, if the measured SIR is not greater than an Rx yielding threshold, the Rx yielding occurs, and the reception node does not reply.

Referring to FIG. 3, if the Tx node A transmits RTS at a transmit power $P_A$, the Rx node D receives the power of $P_A|hAD|^2$. If the Tx node C with high priority transmits RTS at Tx power $P_C$, transmission of RTS from the Tx node C incurs interference to the high priority link A-B. At this time, if the SIR measured by the Rx node D is less than the Rx yielding threshold, the Rx node D has to yield signal reception to protect the link A-B. For example, if the following inequality of Equation (1) is satisfied, the Rx node D gives up D2D communication.

$$\frac{P_C|h_{CD}|^2}{P_A|h_{AD}|^2} < \eta_{RX} \qquad \text{Equation (1)}$$

The Tx node of the low priority link checks determines whether the transmission from the Tx node incurs interference to the high priority link. If the Tx node determines that interference to the high priority link is not great, then the Tx node transmits signals. For example, in the state in which the low priority Tx node incurs interference to the high priority link, the Tx node yields D2D communication for protecting the high priority link.

Referring to FIG. 3, if the high priority Tx node A transmits RTS at the transmit power $P_A$, the Rx node B receives the power of $P_A|hAB|^2$. If the Tx node C transmits RTS at the power of PC, transmission of RTS from the Tx node C incurs interference to the high priority Rx node B. At this time, the SIR measured by the Rx node is less than the Tx yielding threshold, the Tx node C has to yield transmission for protecting the high priority link A-B. For example, if the SIR measured by the Rx node B satisfies the condition of inequality of Equation (2), the Tx node C may give up D2D communication.

$$\frac{P_A|h_{AB}|^2}{P_C|h_{BC}|^2} < \eta_{TX} \qquad \text{Equation (2)}$$

In order to confirm the conditional inequality of Equation (2), the Tx node C has to capability of estimating the value of $(P_A|h_{AB}|^2)/(|h_{BC}|^2)$. For this purpose, the high priority Rx node B transmits inverse power echo. The inverse power echo is used to transmit an inverse value of the Rx power from the Tx node A, and the power of the inverse power echo signal is transmitted at $PE=1/(P_A|h_{AB}|^2)$. Meanwhile, the inverse power echo signal is received by the Tx node C at the power of $rP=(|h_{BC}|^2)/(P_A|h_{AB}|^2)$ to which the channel gain $h_{BC}$ is reflected. Accordingly, if the uplink power echo signal is received, the Tx node C is capable of estimating the left hand side of the above inequality of Equation (2) with $1/(rp \times P_C)$ and compares this with the Tx yield threshold to determine whether to yield transmission.

System Model

In the following various embodiments of the present disclosure, the description is directed to the D2D communication system in which the nodes communicate data through direct links therebetween in OFDM-based synchronous Media Access Control mechanism. This system performs scheduling based on the signaling scheme and SIR-based yielding procedure defined in FlashLinQ.

Figure 4:
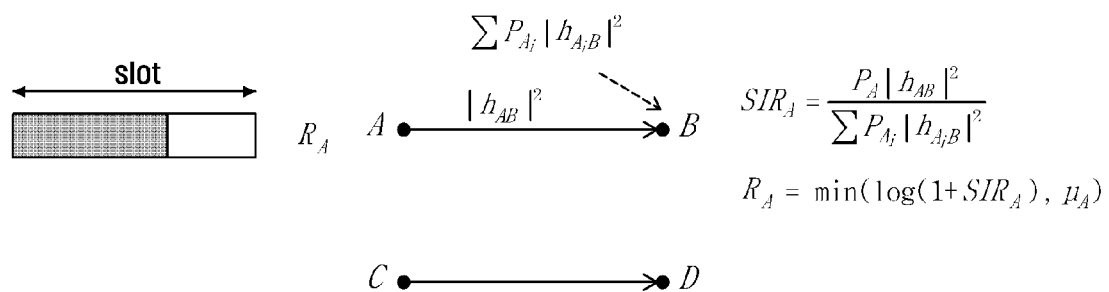
FIG. 4 is a diagram illustrating a scheduling mechanism according to an embodiment of the present disclosure.

Analysis on Throughput Improvement of Transmission Backoff-Based Adaptive Yielding FIG. 4 is a diagram illustrating a scheduling mechanism according to an embodiment of the present disclosure.

Referring to FIG. 4, in order to protect the high priority link, the low priority link yields. For example, FIG. 4 shows the scheduling result in the case in which there is no interference caused by the C-D link.

Referring to FIG. 4, assuming the slot length is T and the number of bits waiting in the buffer is B, the channel capacity required for transmitting the data is $\mu A=B/T$. The reception SIR on the link A-B is given as $SIR_A=P_A|h_{AB}|^2/\Sigma P_{A_i}|h_{A_iB}|^2$ and, at this time, the channel capacity of the link is given as $\log(1+SIR_A)$. The actual channel capacity on the link A-B is given as $R_A=\min(\log(1+SIR_A), \mu_A)$ as shown in FIG. 4.

Figure 5:
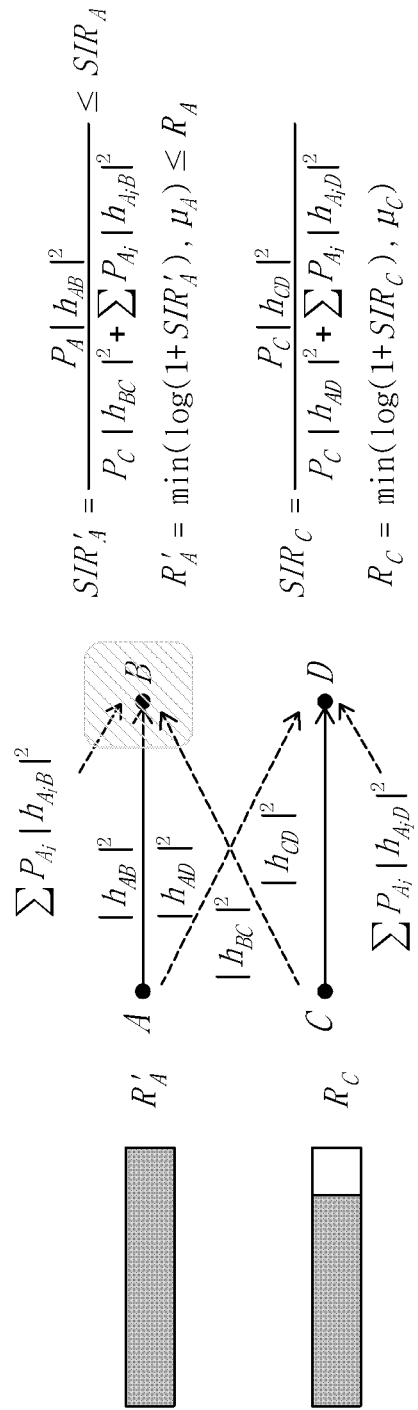
FIG. 5 is a diagram illustrating a scheduling mechanism according to an embodiment of the present disclosure.

FIG. 5 is a diagram illustrating a scheduling mechanism according to an embodiment of the present disclosure.

Referring to FIG. 5, the high priority link tolerates the interference from the priority link and decreases a data rate of the high priority link.

Referring to FIG. 5, the reception SIR on the link A-B to which the additional interference is reflected is given as $SIR'_A=P_A|h_{AB}|^2/(P_C|h_{BC}|^2+\Sigma P_{A_i}|h_{A_iB}|^2) \leq SIR_A$ and the actual channel capacity becomes $R'_A=\min(\log(1+SIR'_A), \mu_A) \leq R_A$.

If the low priority link C-D has the required capacity of $\mu_C$, the SIR of the link C-D is $SIR_C=P_C|h_{CD}|^2/(P_A|h_{AD}|^2+\Sigma P_{A_i}|h_{A_iD}|^2)$ such that the actual capacity on the corresponding channel becomes $R_C=\min(\log(1+SIR_C), \mu_C)$. If $R'_A+R_C>R_A$, it is possible to increase the entire throughput by decreasing the $R_A$ of the high priority link to $R'_A$. If the sum of the data rates on the links that can be scheduled additionally is greater than the data rate loss caused by yielding of the high priority link, decreasing the data rate on the high priority link is possible.

CTS Power Control for "Conservative Yielding"

The Rx node of the high priority link may allow for scheduling of the low priority links in the range of additionally tolerable interference range. For this purpose, calculating the interference in the range tolerable at the Rx node of the high priority link may be required. Accordingly the CTS signal transmit power are determined such that the connection allowable low priority links do not yield transmission.

Figure 6:
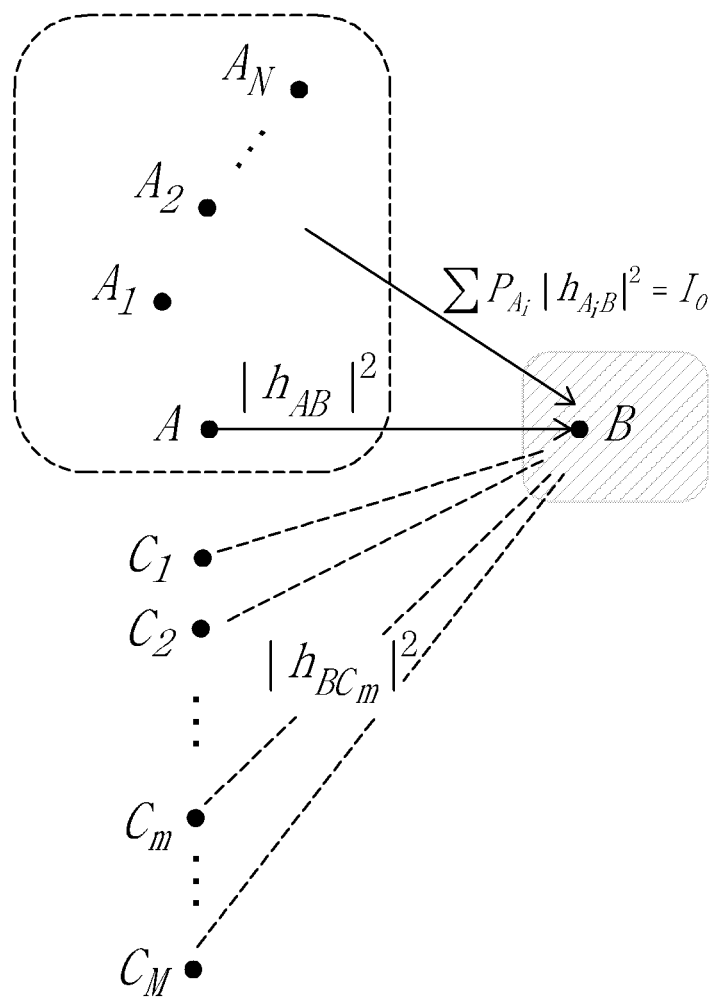
FIG. 6 is a diagram illustrating a link model in consideration of conservative yielding according to an embodiment of the present disclosure.

FIG. 6 is a diagram illustrating a link model in consideration of conservative yielding according to an embodiment of the present disclosure.

Referring to FIG. 6, M low priority links are assumed to exist and the link A-B is assumed to be the high priority link as current reference. The bandwidth efficiency required on the link A-B is expressed as μ-A. The low priority links incur interferences to the Rx node B, the interferences varying depending on the channel gain $|h_{BC_1}|^2 \geq |h_{BC_2}|^2 \geq \ldots \geq |h_{BC_M}|^2$. In the procedure of determining the links allowable at the Rx node B, the allowance is determined in a low-interference first order.

Referring to FIG. 6, scheduling is allowed from the Mth link (CM-B link) with priority to the mth link ($C_{m\text{-}B}$ link). The maximum interference experienced by the Rx node B is expressed by Equation (3):

$$I_t = I_0 + \Sigma_{k=m}^{M} P_{C_k} |h_{BC_k}|^2 \qquad \text{Equation (3)}$$

$I_0$ denotes the interference from the links having high priorities that are uncontrollable. Assuming the SIR of $R_x$ node B is $SIR'_A$, the channel capacity of the link A-B can be expressed as $R'_A = \log(1+SIR'_A) = \log(1+(P_A|h_{AB}|^2/(I_0+\Sigma_{k=m}^{M} P_{C_k}|h_{BC_k}|^2)))$. $R'_A$ has to fulfil the required bandwidth efficiency $\mu_A$. For example, if the maximum allowable interference is given as $I_{max}$, Equation (4) should be satisfied.

$$\mu_A \leq R'_A = \log(1+P_A|h_{AB}|^2/I_{max}) \qquad \text{Equation (4)}$$

According to various embodiments of the present disclosure, the maximum allowable interference can be expressed by Equation (5).

$$I_{max} = P_A|h_{AB}|^2/(2^{\mu_A}-1) \qquad \text{Equation (5)}$$

From Equations (4) and (5), the condition for actual control can be expressed by Equation (6).

$$I_t \leq I_{max} \qquad \text{Equation (6)}$$

According to the condition of Equation (6), the scheduling can be allowed to the Tx node $C_{m^*}$, and m* is expressed by Equation (7).

$$m^* = \min\{m | I_{max} \geq I_0 + \Sigma_{k=m}^{M} P_{C_k} |h_{BC_k}|^2\} \qquad \text{Equation (7)}$$

Yielding for links having low priorities in the range of fulfilling the required bandwidth efficiency is referred to as conservative yielding and, in order to achieve this, preventing the scheduling-allowed low priority links from yielding transmission is required. The transmission yielding is determined based on the reverse power of the Rx node B in FIG. 6. In order to avoid transmission yielding, the SIR at the Tx node receiving the CTS signal transmitted at reverse transmit power of the Tx node is greater than the Tx yielding threshold. At the Tx node receiving CTS, because the SIR of the RX node B is given as the inverse value of the reverse power PE, the Rx node B has to adjust such that the reverse power set to small value.

According to various embodiments of the present disclosure, CTS power control coefficient α is introduced and 0<α<1 has to be fulfilled. The reverse power can be expressed by Equation 8:

$$P_E = \frac{\alpha}{P_A|h_{AB}|^2} \qquad \text{Equation (8)}$$

If the Tx nodes which has received CTS satisfy inequality expressed by Equation (9), the Tx nodes are allowed for scheduling without transmission yielding.

$$(1/\alpha) \cdot \{P_A|h_{AB}|^2/(P_{C_m}|h_{BC_m}|^2)\} \geq \eta_{TX},\ m=M, M-1, \ldots, m^* \qquad \text{Equation (9)}$$

The CTS power control coefficient fulfilling the above condition may be expressed by Equation (10):

$$\alpha^* = \frac{P_A|h_{AB}|^2}{P_C|h_{BC_{m^*}}|^2 \eta_{TX}} \qquad \text{Equation (10)}$$

Figure 7:
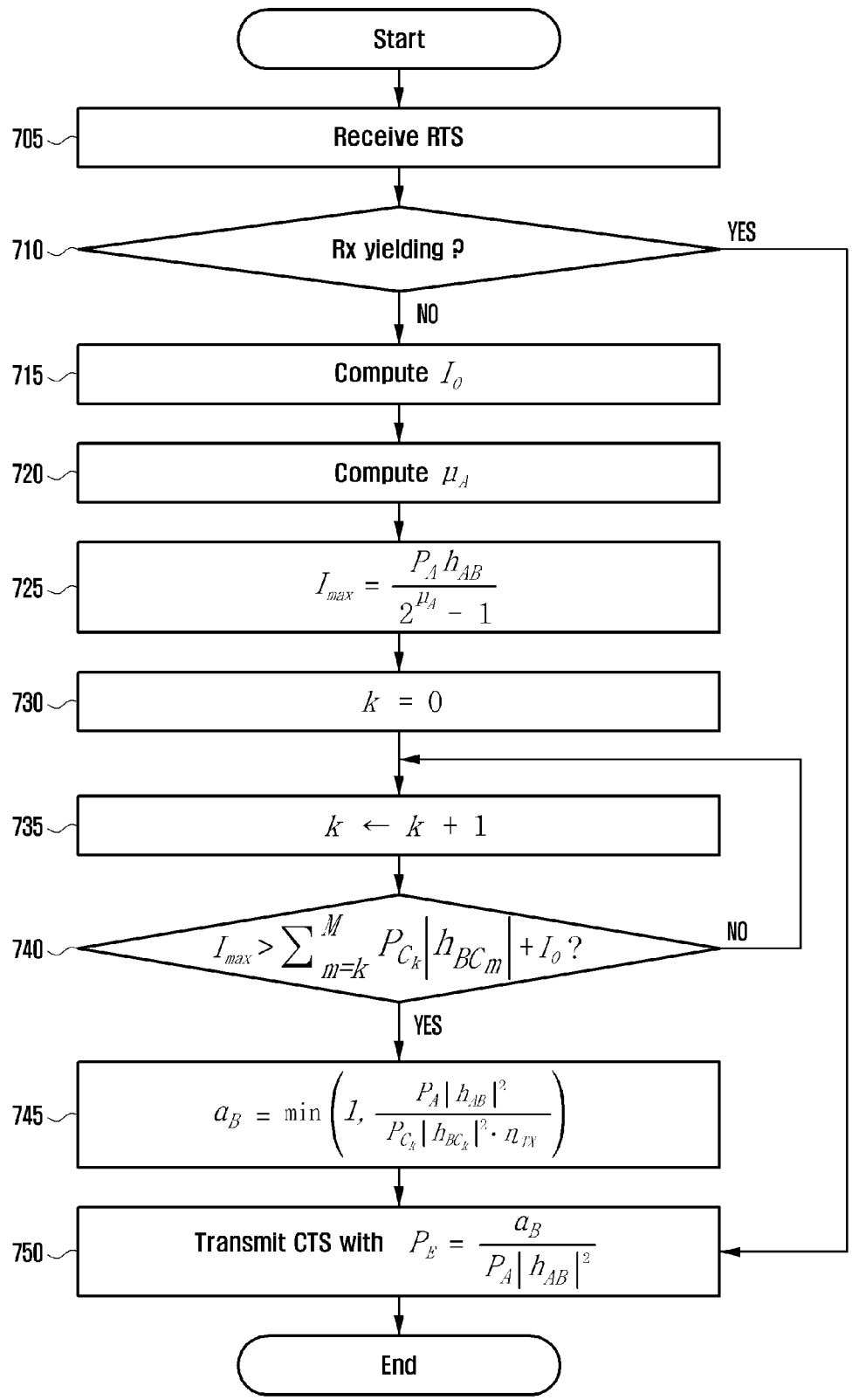
FIG. 7 is a flowchart illustrating a CTS power control procedure for conservative yielding according to an embodiment of the present disclosure.

FIG. 7 is a flowchart illustrating a CTS power control procedure for conservative yielding according to an embodiment of the present disclosure.

Referring to FIG. 7, at operation 705, the node receives RTS.

At operation 710, the node determines whether the Rx yielding is applied.

If the node determines that the Rx yielding is applied at operation 710, the procedure proceeds to operation 750.

If the node determines that the Rx yielding is not applied at operation 710, the procedure proceeds to operation 715 at which node calculates $I_0$ as described above.

At operation 720, the node calculates $\mu_A$ using Equation (4).

At operation 725, the node calculates $I_{max}$ using Equation (5) as described above.

At operation 730, the node set k to 0.

At operation 735, the node increase k by 1.

At operation 740, the node performs comparison to determine whether the inequality expressed by Equation (7) is satisfied.

If the node determines that the inequality expressed by Equation 7 is not satisfied at operation 740, then the procedure returns to operation 735. The node repeats operations 735 and 740 by increasing k by 1 until the node determines a k for which the inequality expressed by Equation (7) is satisfied.

If the node determines that the inequality expressed by Equation 7 is satisfied at operation 740, then the procedure proceeds to operation 745. For example, if the node determines a k for which the inequality expressed by Equation (7) is satisfied, the procedure goes to operation 745.

At operation 745, the node calculates $\alpha_B$ using Equation (10). $\alpha_B$ corresponds to α* of Equation (10).

At operation 750, the node transmits CTS at the power PE. PE may be acquired using Equation (8) as described above.

In order to apply the conservative yielding, the Rx node is generally required to know the number of bits waiting in the buffer of the Tx node. The Tx node quantizes the number of bits waiting in the buffer through a predetermined quantization procedure and transmits the quantization result along with the data.

RTS Power Control for "Generous Yielding"

The low priority links allowed for scheduling through the conservative yielding may not perform conservative yielding due to the Rx yielding in the Tx block. In order to solve this problem, there is a need of the generous yielding of the high priority links.

Whether to apply the generous yielding is determined based on the amount of bits waiting in the buffer of the high priority link and, for this purpose, a buffer threshold is configured. If the number of bits to be transmitted is equal to or less than the buffer threshold, the RTX power decreases to prevent Rx yielding. Because it is difficult know the extent of the generous yielding required by the low priority, the power control has to be performed in stepwise manner. For this purpose, a power control factor Δ is configured to increase the power in stepwise manner or to increase the power in stepwise manner when the transmission bit amount is greater than the threshold.

Figure 8:
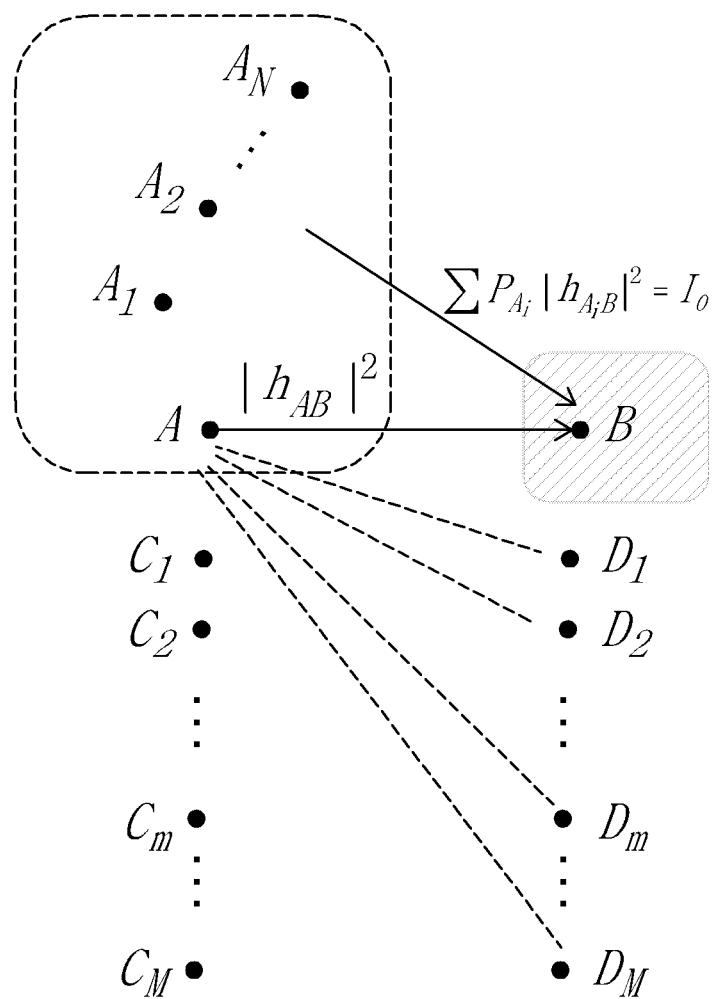
FIG. 8 is a diagram illustrating a link model in consideration of generous yielding according to an embodiment of the present disclosure.

FIG. 8 is a diagram illustrating a link model in consideration of generous yielding according to an embodiment of the present disclosure.

Referring to FIG. 8, the high priority Tx node A decreases power based on the RTS power control coefficient β under the control of 0<β<1. The RX nodes of the low priority links do not consider Rx yielding as long as inequality of Equation (11) is satisfied.

$$\frac{P_{C_m}|h_{C_mD_m}|^2}{\beta \cdot P_A|h_{AD_m}|^2} > \eta_{RX} \qquad \text{Equation (11)}$$

If the transmission bit amount exceeds the threshold value, the Tx node A increases the Tx power using the power control coefficient 1/β to give up the generous yielding.

Figure 9:
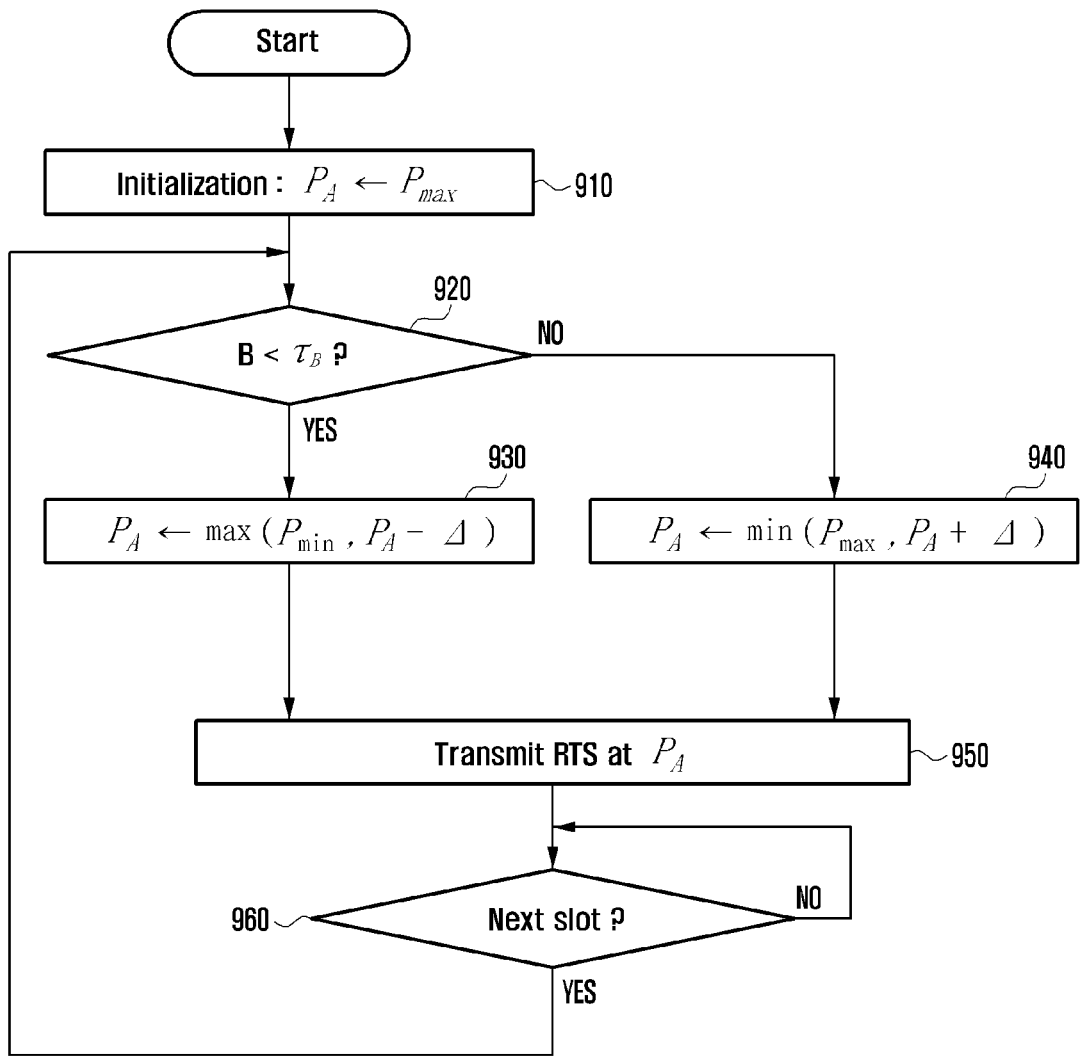
FIG. 9 is a flowchart illustrating an RTS power control procedure for generous yielding according to an embodiment of the present disclosure.

FIG. 9 is a flowchart illustrating an RTS power control procedure for generous yielding according to an embodiment of the present disclosure.

Referring to FIG. 9, $P_{max}$ and $P_{min}$ denote maximum and minimum powers of the Tx node respectively, and the power of the Tx node is restricted in the range between the maximum and minimum powers in the power increase/decrease process under the power control.

At operation 910, the node initializes $P_A$ to $P_{max}$.

At operation 920, the node compares B with $\tau_B$. B denotes the transmission bit amount waiting in the buffer, and $\tau_B$ denotes the buffer threshold.

If the node determines that B>$\tau_B$ at operation 920, then the node proceeds to operation 940 at which the node increases the transmit power as much as Δ(dB). Thereafter, the node proceeds to operation 950.

In contrast, if the node determines that B>$\tau_B$ at operation 920, then the node proceeds to operation 930 at which the node decreases the Tx power as much as Δ(dB). Thereafter, the node proceeds to operation 950.

At operation 950, the node transmits RTS at power $P_A$.

At operation 960, the node determines whether the next slot has arrived. For example, the node waits for the next slot and repeats operations 920 to 950 at the next slot.

Figure 10:
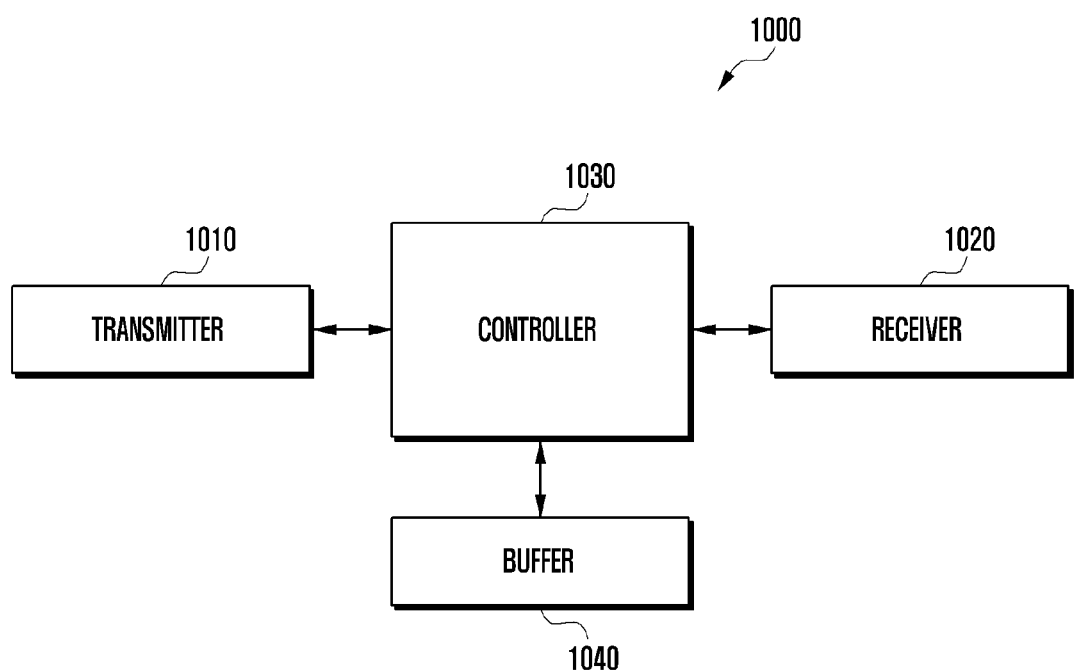
FIG. 10 is a block diagram illustrating a configuration for a scheduling apparatus according to an embodiment of the present disclosure.

FIG. 10 is a block diagram illustrating a configuration for the scheduling apparatus according to an embodiment of the present disclosure.

Referring to FIG. 10, the scheduling apparatus 1000 includes a transmitter 1010, a receiver 1020, a controller 1030, and a buffer 1040. According to various embodiments of the present disclosure, the scheduling apparatus 1000 may be one of the transmission node and the reception node of the D2D link.

The transmitter 1010 may transmit RTS to the reception node and transmits CTS to the transmission node. The transmitter 1010 may transfer the data indicating the state of the buffer 1040 to the reception node. The state of the buffer 1040 may be the data amount or a number of bits queued in the buffer 1040.

The receiver 1020 may receive the RTS from the transmission node and the CTS from the reception node.

The controller 1030 controls overall operations of the scheduling apparatus 1000, particularly the transmitter 1010 and the receiver 1020. For example, according to various embodiments of the present disclosure, the controller 1030 may operatively perform operations 705 to 750 of FIG. 7 and operations 910 to 960 of FIG. 9.

The buffer 1040 may buffer the transmitted data.

The D2D communication scheduling method and apparatus of the present disclosure is capable of acquiring efficient spatial reuse rate.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to functions thereof.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The foregoing disclosure has been set forth merely to illustrate the present disclosure and is not intended to be limiting. Because modifications of the disclosed various embodiments incorporating the spirit and substance of the present disclosure may occur to persons skilled in the art, the present disclosure should be construed to include everything within the scope of the appended claims and equivalents thereof.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A scheduling method of a node in a wireless communication system, the method comprising:
    acquiring a first data rate on a first link in consideration of interference occurring if a second link is established;
    acquiring a second data rate on the first link without consideration of the second link;
    acquiring, if the second link is established, a third data rate on the second link;
    determining whether to establish the second link based on the first data rate, second data rate, and third data rate; and
    performing a scheduling for at least one of the first link or the second link based on a result of the determination.

2. The method of claim 1, wherein the determining of whether to establish the second link comprises:
    calculating a sum of the first data rate and the third data rate;
    comparing the sum with the second data rate; and
    determining whether to establish the second link based on the comparison of the sum with the second data rate.

3. The method of claim 1, further comprising:
    determining whether to establish the second link based on Request to Send (RTS) transmit powers on the first link and second link.

4. The method of claim 3, further comprising:
    adjusting the RTS transmit power on the first link based on state of a buffer of a transmission node of the first link.

5. The method of claim 4, further comprising:
    decreasing, if a data amount queued in the buffer is equal to or less than a threshold value, the RTS transmit power on the first link.

6. The method of claim 4, further comprising:
    increasing, if a data amount queued in the buffer is equal to or greater than a threshold value, the RTS transmit power.

7. The method of claim 3, further comprising:
    adjusting a Clear to Send (CTS) transmit power on the first link according to state of a buffer of a transmission node of the first link.

8. The method of claim 7, further comprising:
    transmitting data indicating the state of the buffer of the transmission node of the first link to a reception node of the first link.

9. The method of claim 1, wherein the first link has a priority higher than a priority of the second link.

10. A non-transitory computer-readable storage medium storing instructions that, if executed, cause at least one processor to perform the method of claim 1.

11. A node comprising:
    a controller configured to control acquiring a first data rate on a first link in consideration of interference occurring if a second link is established, acquiring a second data rate on the first link without consideration of the second link, acquiring, if the second link is established, a third data rate on the second link, and determining whether to establish the second link based on the first data rate, second data rate, and third data rate, and performing a scheduling for at least one of the first link or the second link based on a result of the determination; and
    a receiver configured to receive a Request to Send (RTS) requesting for establishment of the second link.

12. The apparatus of claim 11, wherein the controller compares a sum of the first data rate and the third data rate with the second data rate and determines whether to establish the second link based on the comparison of the sum of the first data rate and the third data rate with the second data rate.

13. The apparatus of claim 11, wherein the controller further configured to determine whether to establish the second link based on Request to Send (RTS) transmit powers on the first link and second link.

14. The apparatus of claim 13, wherein, if a data amount queued in the buffer is equal to or less than a threshold value, the RTS transmit power on the first link is decreased.

15. The apparatus of claim 13, wherein a Clear to Send (CTS) transmit power on the first link is adjusted according to state of a buffer of a transmission node of the first link.

16. The apparatus of claim 15, wherein the controller is further configured to transmit data indicating the state of the buffer of the transmission node of the first link to a reception node of the first link.

17. The apparatus of claim 11, wherein the RTS transmit power on the first link is adjusted based on state of a buffer of a transmission node of the first link.

18. The apparatus of claim 17, wherein, if a data amount queued in the buffer is equal to or greater than a threshold value, the RTS transmit power is increased.

19. The apparatus of claim 11, wherein the first link has a priority higher than a priority of the second link.

* * * * *